Aug. 8, 1939.  A. V. D. WILLGOOS  2,168,814

REDUCTION GEAR

Filed Sept. 22, 1936

INVENTOR.
Andrew V.D. Willgoos,
BY Harris G. Luther
ATTORNEY

Patented Aug. 8, 1939

2,168,814

UNITED STATES PATENT OFFICE 2,168,814

REDUCTION GEAR

Andrew V. D. Willgoos, West Hartford, Conn., assignor to United Aircraft Corporation, East Hartford, Conn., a corporation of Delaware Application September 22, 1936, Serial No. 101,943

4 Claims. (Cl. 74—421)

This invention relates to improvements in reduction gear drives, and has particular reference to a reduction gear unit for use between the power shaft and the propeller shaft of a power plant, such as an internal combustion engine of the type ordinarily employed for the propulsion of aircraft or other vehicles.

An object of the invention resides in the provision of a reduction gear unit of the character described in which the load between the power shaft and the propeller shaft is divided among a plurality of intermediate gears located in spaced relation about the axis of the power shaft and propeller shaft.

A further object resides in the provision of a reduction gear unit of the character described which provides for a wide variation of gear ratios by changing the gear elements without the necessity of changing the gear housing or bearing supports.

A still further object resides in the provision of gear elements arranged to provide a slight amount of resiliency between intermediate driven and driving gears to assist in equalizing the tooth loads upon all of the gears.

An additional object resides in the provision of a reduction gear unit of the character described arranged to drive the valve operating cam member of the engine to thereby eliminate the various working parts ordinarily employed in addition to the reduction gear to drive the cam member.

Other objects and advantages will be more particularly pointed out hereinafter or will become apparent as the description proceeds.

In the accompanying drawing in which like reference numerals are used to designate similar parts throughout, there is illustrated a suitable mechanical embodiment of what is now considered to be the preferred form of the idea of the invention. The drawing, however, is for the purpose of illustration only and is not to be taken as limiting the invention the scope of which is to be measured entirely by the scope of the appended claims.

Figure 1:
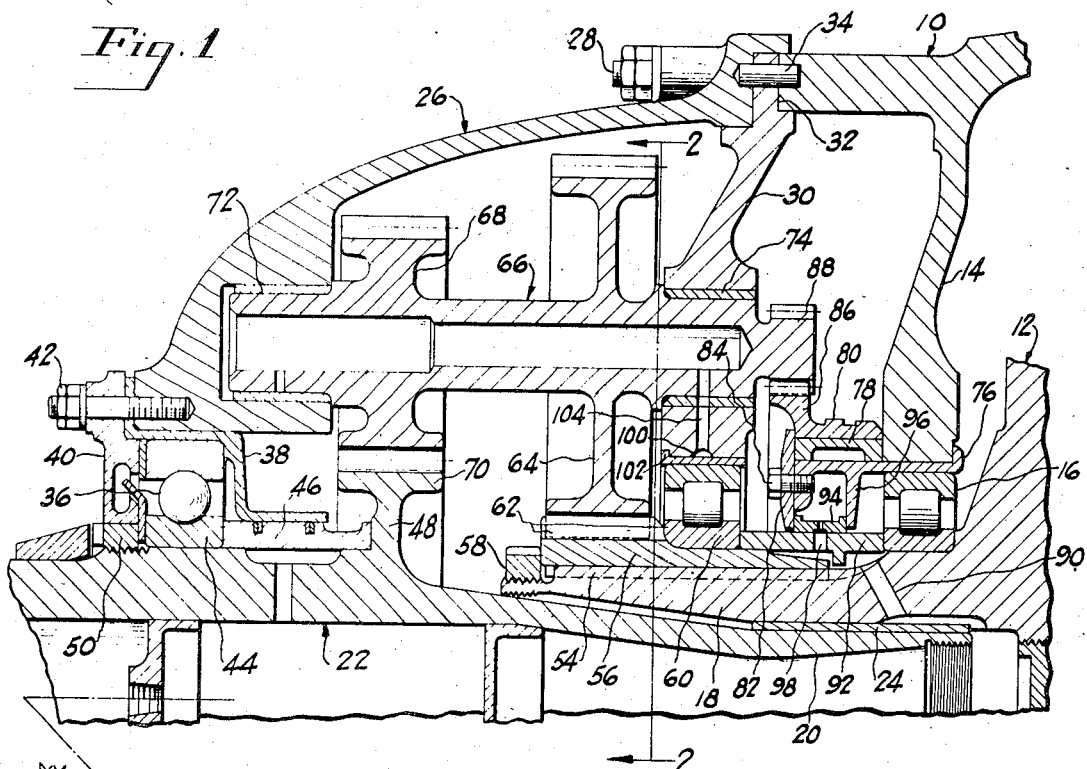
Fig. 1 is a vertical sectional view of a fragmentary portion of a reduction gear and cam drive unit constructed according to the idea of the invention.
Figure 2:
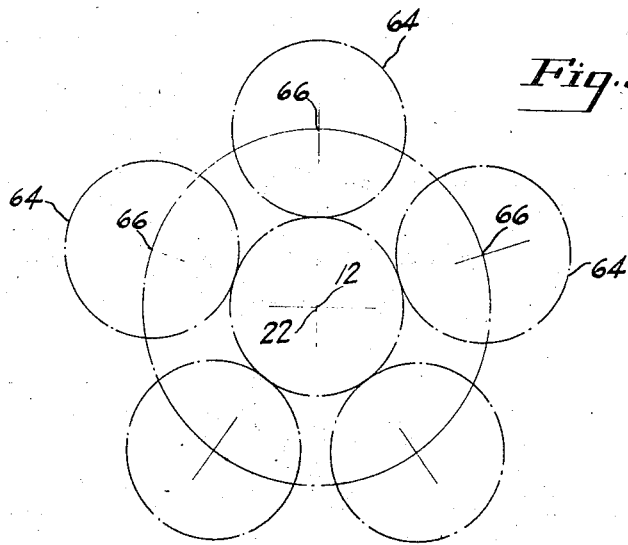
Fig. 2 is a partly schematic sectional view on a reduced scale taken on the line 2—2 of Fig. 1.

Referring to the drawing in detail, the numeral 10 generally indicates the crankcase of an internal combustion engine, such as a radial air-cooled engine ordinarily employed for the propulsion of aircraft. It is to be understood, however, that while the reduction gear and cam driving unit is shown as applied to an internal combustion engine of the character specified, this showing is merely for convenience in illustration and the gear can be applied to various forms of power plants, if desired.

Within the crankcase 10 there is rotatably supported a power shaft in the form of a crankshaft, generally indicated at 12. The crankcase 10 is provided with a transverse portion 14 adjacent to its front end provided with a central aperture within which is disposed an antifriction bearing 16 within which the front or driving end of the crankshaft 12 is rotatably supported. The crankshaft extends forwardly of the bearing 16 and is provided with a hollow end portion 18 which receives the rear end portion 20 of a driven propeller shaft, generally indicated at 22. The overlapping end portions of the crankshaft and the propeller shaft provide what is ordinarily termed a spigot bearing arrangement, and a plain bearing 24 is desirably disposed between the overlapping ends of these shafts to provide for relative rotation of one shaft with respect to the other.

A nosepiece, generally indicated at 26, is secured to the front end of the crankcase 10 opposite the transverse end portion 14 by a suitable means, such as the stud bolts or cap screws 28. In the form of the invention illustrated, a transverse partition member 30 has an annular peripheral flange portion 32 disposed between the adjacent end portions of the crankcase and the nosepiece and extends into the interior of the nosepiece substantially parallel to the transverse end portion 14. Dowel pins 34 may be inserted if desired through the flange portion 32 to engage in apertures in the crankcase and nosepiece to provide a guide for mounting the nosepiece upon the crankcase and to assist in restraining the nosepiece against rotation with respect to the crankcase during operation of the engine.

An antifriction bearing 36 has its outer race rigidly secured in the front end of the nosepiece 20 by suitable means, such as the cage member 38, cover member 40, and stud bolts or cap screws 42 and its inner race 44 rigidly secured upon the propeller shaft 22 by suitable means, such as the oil collector ring 46 abutting against an annular web portion 48 and the annular nut 50 which may be threaded upon the propeller shaft to clamp the race 44 between the nut and the oil collector ring 46. From this description, it will be observed that the antifriction bearing 36 provides an annular support for the propeller shaft 22 in the nosepiece 26 and also serves to absorb all end thrusts in the shaft 22 such as might be induced by a propeller 52 mounted upon and driven by the shaft.

The end 18 of the crankshaft 12 is provided with a series of external splines 54 which engage with corresponding internal splines provided in a sleeve member mounted upon the end of the shaft and retained thereon by suitable means, such as the annular nut 58. An antifriction bearing 60 is disposed within a central aperture in the transverse partition member 30 and surrounds the sleeve member 56 to provide a bearing support for the sleeve member in the transverse partition.

The sleeve member 56 is provided with an annular series of gear teeth 62 which mesh with cooperating teeth upon a plurality of gear elements 64 mounted upon or formed integrally with a plurality of countershafts one of which is generally indicated at 66 in Fig. 1.

Spaced from the gear elements 64 the countershaft 66 carries a second gear element 68 the teeth of which mesh with the teeth of a gear element 70 formed upon the periphery of the annular web portion 48 provided on the propeller shaft 22.

At its forward end, each countershaft 66 is rotatably supported in a bearing 72 in the forward end of the nosepiece 26 and at its rear end each countershaft is rotatably supported in a similar bearing 74 provided in the transverse partition member 30.

From the description so far, it will be observed that as the power shaft or crankshaft 12 rotates, the gear teeth 62 drive the gear elements 64 which rotates the countershaft 66 in its bearings 72 and 74. Rotation of the countershafts drive the gear elements 68 which in turn drive the gear element 70 formed upon the shaft 22 and thus drive the shaft 22. It will also be observed that by providing cooperating gear elements having different ratios to each other the speed change from the power shaft to the propelling shaft can be varied within wide limits.

In the form of the invention illustrated, the gear unit is utilized as a reduction gear and, therefore, the gear element carrying the teeth 62 is made smaller than the gear element 70 and the gear element 68 meshing with the gear element 70 is made smaller than the gear elements 64. Thus a speed reduction is provided between both sets of intermeshing gears. It is obvious that with a gear arrangement of the type described any desired change between the speed of the power shaft and the speed of the propeller shaft 22 can be attained within the practical limits of the reduction gear mechanism.

The portion of each countershaft 66 between the gear elements 64 and 68 is preferably proportioned so that it has a slight resiliency under the torsional loads imposed upon it by the drive and driven gear elements 64 and 68. With such an arrangement, the necessary amount of elasticity or "give" is provided to substantially equalize the tooth loads of the gears of all of the countershafts forming the series.

An annular cam support 76 is secured in the central aperture of the transverse end portion 14 of the crankcase by being inserted between the interior of the aperture and the outer race of the bearing 16. This support extends forwardly of the end portion 14 and carries a bearing member 78 upon which is rotatably supported a valve cam ring 80. The valve cam ring 80 and the bearing member 78 are retained upon the support 76 by suitable means, such as the retaining ring 82 secured to the support 76 by cap screws 84.

The valve cam ring 80 is provided at one edge thereof with an annular gear element 86 the teeth of which mesh with the teeth of a driving gear 88 formed upon the rear end of the countershaft 66. In the form of the invention illustrated, the gears 86 and 88 are located between the transverse end portion 14 of the crankcase and the transverse partition member 30, the gear element 88 being slightly smaller than the portion of the countershaft received within the bearing 74 so that the gear element may be inserted through the bearing opening during assembly of the device.

From the description so far, it will be observed that as the gear element 66 is driven by the crankshaft 12 to rotate the respective countershaft 66, the gear element 88 will be rotated and will drive the gear element 86 to rotate the valve cam ring 80.

Gear elements 88 may be provided upon all of the countershafts 66, if desired, or may be provided only upon one countershaft or any number of countershafts less than the total number in the series.

Suitable means may be provided for lubricating the various moving parts of the gear unit. As an example, lubricant may be fed to the bearing 24 through a channel 90 extending from the inner side of a ring member 92 which carries upon its exterior a packing ring 94 received between the retaining ring 82 and an annular radial flange 96 provided upon the interior of the cam supporting ring 76. In this construction, oil under pressure is fed into the annular space between the retaining ring 82 and radial flange 96 and is led through a channel 98 to the interior of the ring 92. For lubricating the bearings 72 and 74, an oil pressure channel or manifold 100 may be provided in the surface of the central aperture provided in the transverse partition 30, between the partition and the bearing liner 102. From this manifold, the oil may be led through suitable channels 104 to the hollow interiors of the various countershafts 66 and from the interiors of the countershafts distributed to the countershaft bearings. Other provisions for adequate lubrication of the various working parts may be made without in any way departing from the scope of the invention.

In the accompanying drawing there has been illustrated and described a particular mechanical arrangement exemplifying the idea of the invention. It is to be understood, however, that the invention is not limited to the particular construction so illustrated and described but that such changes in the size, shape, and arrangement of parts may be resorted to as come within the scope of the appended claims.

Having now described my invention so that others skilled in the art may clearly understand the same, what it is desired to secure by Letters Patent is as follows.

What is claimed is:

1. In an internal combustion engine having a crankcase, a crankshaft rotatably supported in said crankcase, a propeller shaft driven by said crankshaft, and a valve cam member also driven by said crankshaft at a reduced speed, a reduction gear unit comprising a gear on said crankshaft, a gear on said propeller shaft, a gear on said valve cam member, a countershaft rotatably supported in said crankcase, and gears on said countershaft meshing respectively with said crankshaft gear, said propeller shaft gear and said valve cam member gear, and providing a speed reducing drive between said crankshaft and said propeller shaft and between said crankshaft and said valve cam member.

2. In an internal combustion engine having a crankcase, a crankshaft rotatably supported in said crankcase, a propeller shaft driven by said crankshaft, and a valve cam member also driven by said crankshaft at a reduced speed, a reduction gear unit providing a speed reducing drive between said crankshaft and said propeller shaft and between said crankshaft and said valve cam member, said unit comprising, a gear on said crankshaft, a gear on said propeller shaft, a gear on said valve cam member, a plurality of counter shafts spaced about said crankshaft and said propeller shaft with their axes parallel to the crankshaft and propeller shaft axis, and separate gears on said countershafts meshing simultaneously with the gears on said crankshaft, said propeller shaft, and said valve cam member.

3. In an internal combustion engine having a crankcase, a crankshaft rotatably supported in said crankcase, a propeller shaft driven by said crankshaft, and a valve cam member also driven by said crankshaft at a reduced speed, a reduction gear unit providing a speed reducing drive between said crankshaft and said propeller shaft and between said crankshaft and said valve cam member, said unit comprising, a plurality of countershafts spaced about the abutting portions of said crankshaft and said propeller shaft in parallel relation thereto, a gear drive between said crankshaft and each of said countershafts, a second gear drive between each of said countershafts and said propeller shaft, and a third gear drive between at least one of said countershafts and said valve cam member.

4. In an internal combustion engine having a crankcase, a crankshaft rotatably mounted in said crankcase, a propeller shaft coaxial with said crankshaft and a valve cam member rotatably supported in said crankcase, means providing a speed reducing drive between said crankshaft and said propeller shaft and between said crankshaft and said valve cam member comprising, a transverse partition member secured to said crankcase and providing a bearing support for the driving end of said crankshaft, a nosepiece secured to said crankcase and providing a bearing support for said propeller shaft, a plurality of countershafts spaced about the abutting portions of said crankshaft and said propeller shaft, each of said countershafts having a bearing support at one end in said nosepiece and at the other end in said transverse partition, separate gears on each countershaft meshing with cooperating gears on said crankshaft and said propeller shaft, and a gear on the partition supported end of each countershaft meshing with a gear on said valve and member.

ANDREW V. D. WILLGOOS.